H. D. KELLY.
SELF CLOSING STEAM VALVE.
APPLICATION FILED FEB. 17, 1917.

1,282,589.

Patented Oct. 22, 1918.

Inventor
H. D. Kelly
By
George F. Thorpe
Atty.

UNITED STATES PATENT OFFICE.

HENRY D. KELLY, OF KANSAS CITY, MISSOURI.

SELF-CLOSING STEAM-VALVE.

1,282,589.             Specification of Letters Patent.      Patented Oct. 22, 1918.

Application filed February 17, 1917.   Serial No. 149,696.

*To all whom it may concern:*

Be it known that I, HENRY D. KELLY, a citizen of the United States, residing at Kansas City, in the county of Jackson and State of Missouri, have invented certain new and useful Improvements in Self-Closing Steam-Valves, of which the following is a specification.

This invention relates to self-closing steam valves for coffee urns and the like, and the object of the invention is to produce a valve whereby steam from the boiler of the urn may be caused to circulate through the gage glass, faucet and the connections thereof with the jar, and coöperate with boiling water sprayed from above into the jar, to thoroughly cleanse and sterilize same, and all other parts with which the beverage comes in contact. A further object is to provide the valve with a vent in communication with the valve passage leading to the gage glass, for the escape of steam each time the valve is unseated to supply steam to the gage glass so that the vent shall be kept clear and the depth of the coffee in the urn invariably indicated by a corresponding level of the coffee in the gage glass.

A further object is to produce a self-closing valve of the type outlined which is of simple, strong, durable and compact construction and the parts of which can be easily and quickly assembled in or withdrawn from operative position.

With these objects in view the invention consists in certain novel and useful features of construction and combinations of parts as hereinafter described and claimed; and in order that it may be fully understood, reference is to be had to the accompanying drawing, in which:

Figure 1:
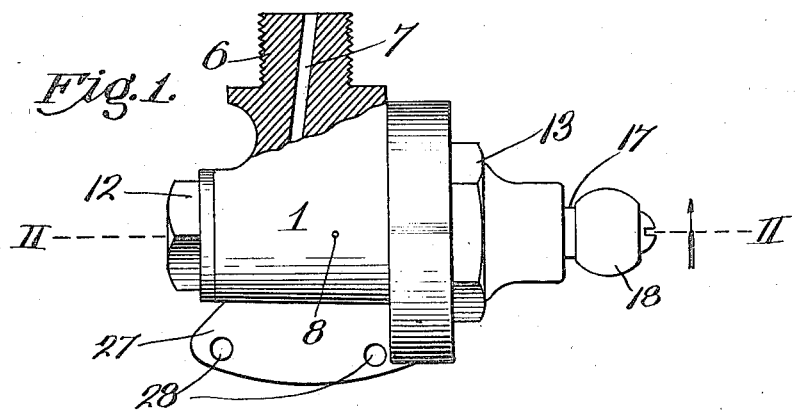
Figure 1, is a top plan view of a steam valve for coffee urns embodying my invention, the valve being broken away to disclose a feature otherwise hidden.
Figure 2:
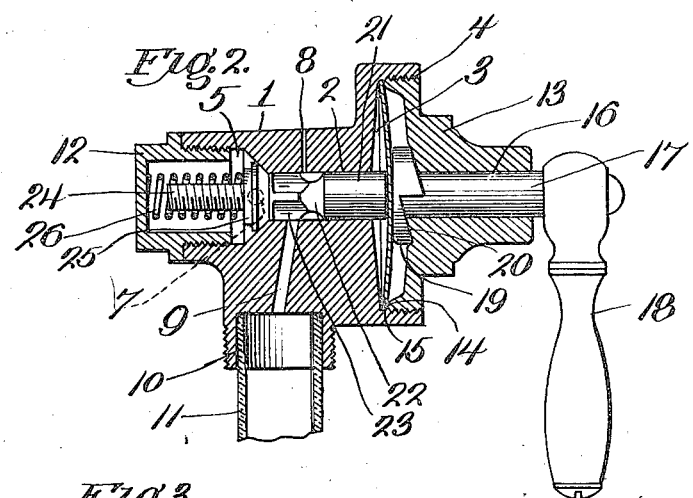
Fig. 2, is a vertical section on the line II—II of Fig. 1.
Figure 3:
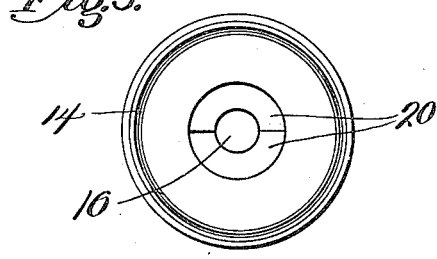
Fig. 3, is an inner face view of the handle supporting and diaphragm securing nut, forming a part of the valve.

In the said drawing, 1 indicates a casing provided with a cylindrical bore or passage 2 enlarged at one end to provide a diaphragm chamber 3, the surrounding wall of which is internally threaded as at 4. The casing at the opposite end of the bore or passage 2 is formed with an enlargement or valve chamber 5 and at one side with a threaded nipple 6 having a passage 7 leading to the valve chamber, the said nipple being adapted to be screwed into the wall of the urn, not shown, and establish communication between the boiler of the urn and said valve chamber 5.

The casing is provided also with a vent 8 leading from the bore or passage 2 and with a port 9 leading from said passage to a socket 10 receiving the upper end of a gage glass 11 in which the coffee is adapted to attain a level equal to that which it attains in the beverage jar of the urn.

12 is a hollow cap nut screwed to the casing and forming a closure for the valve chamber 5, and 13 is a nut engaging the threads 4 of chamber 3 to close said chamber, the said nut having a flange 14 to clamp a diaphragm 15 with a tight joint against the base of the chamber 3. The nut has a smooth central bore 16 wherein is journaled a rock shaft 17 rotatable by means of a handle 18 secured at its outer end, and said shaft is provided at its inner end with a circular cam head 19, coöperatively engaging a corresponding cam face 20 formed on the inner end of the nut 13, and said diaphragm through its resiliency, normally bows outward and holds the cam head and handle in substantially the position indicated. When the handle is turned in the proper direction the cam head 19 rides on the cam face 20 and thus overcomes the resistance of the diaphragm and a spring hereinafter mentioned, and presses the diaphragm to the left so that the latter shall effect unseating movement of the valve constructed as follows: 21 is a cylindrical stem fitting slidingly in bore 2 and provided at an intermediate point with a circumferential channel 22 and with longitudinal waterways or channels 23 in communication with the circumferential channel, said channels being so positioned with respect to vent 8 and passage 9 that air in the gage glass is free to escape from the vent as the level of the coffee rises in said glass, and is free to enter the gage glass as the level of the beverage therein falls through the drawing off of coffee.

The stem is provided with a diametrically-reduced threaded extension 24 occupying the valve chamber and the chamber of the cap 12, and screwed upon said threaded extension is a valve 25, normally held seated and therefore closing communication between bore or passage 2 and chamber 5, through the pressure of a coiled spring 26 mounted on the extension 24 and bearing at its opposite ends against the valve and the outer end of the cap nut 12.

With the valve in normal position as shown, the upper end of the gage glass is in communication with the atmosphere and the valve closes communication between the steam passage 7 and the gage glass and the atmosphere. By proper manipulation of the handle the valve is unseated and steam is permitted to pass through passage 7 into the gage glass to clean the same, and simultaneously through the vent to keep the same unobstructed. When the handle is released, the spring 26 and resilient diaphragm coöperate to force the handle back to normal position, the engagement of the cam head 19 with the cam face 20 causing the former and the handle to turn under the spring pressure applied upon said head.

When it is desired to thoroughly cleanse and sterilize all parts to which the beverage has access, the valve is operated to permit steam to pass from the boiler of the urn down through the gage glass and thence through the faucet and other connections to the jar. At the same time boiling water is caused to spray down into the top of the jar by means common in coffee urns, and this boiling water meets the upwardly circulating steam in the jar and conjointly therewith effects the thorough cleansing of the jar and of the connections and faucet as the water flows through said parts from the jar. The instant the valve handle is released, the spray of steam is cut off, and hence there can be no accidental spray of steam to the jar while the latter contains beverage or while the beverage is being made. A large amount of dry steam permitted to enter the beverage jar would boil and therefore spoil any beverage therein.

As the self closing valve will operate when released, an attendant can not through oversight either spray an excess of steam to the jar or waste steam in the event the jar is empty and the faucet is open.

From the above description it will be apparent that I have produced a self-closing steam valve for coffee urns embodying the features of advantage enumerated as desirable in the statement of the object of the invention, and which is susceptible of modification in minor particulars without departing from the principle of construction involved or sacrificing any of the advantages of the appended claim.

I claim:

A steam valve, comprising a casing having a diaphragm chamber, a valve chamber, a bore or passage connecting said chambers, a vent and a port communicating with the bore or passage and a steam passage leading to the valve chamber, a stem fitting slidingly in said passage connecting said chambers and provided with a circumferential channel and a longitudinal channel establishing communication between said vent and port, a valve secured to the said stem within the valve chamber, yielding means for holding the valve seated, a spring-metal diaphragm in the diaphragm chamber, means securing the diaphragm in said chamber with a steam-tight joint, and means carried by the diaphragm securing means, for operating said diaphragm and causing the same to impart endwise movement to the said stem and consequently unseating movement to said yieldingly-seated valve.

In testimony whereof I affix my signature in the presence of two witnesses.

HENRY D. KELLY.

Witnesses:
K. M. THORPE,
G. Y. THORPE.